(12) United States Patent
Helm

(10) Patent No.: US 6,651,338 B2
(45) Date of Patent: Nov. 25, 2003

(54) METHOD FOR THE PRODUCTION OF A CYLINDRICAL EMBOSSING SHEET

(75) Inventor: Ferdinand Helm, Weiden (DE)

(73) Assignee: Hueck Folien GmbH & Co. KG, Pirk (DE)

( * ) Notice: Subject to any disclaimer, the term of this patent is extended or adjusted under 35 U.S.C. 154(b) by 0 days.

(21) Appl. No.: 09/970,791

(22) Filed: Oct. 5, 2001

(65) Prior Publication Data

US 2002/0040656 A1 Apr. 11, 2002

(30) Foreign Application Priority Data

Oct. 5, 2000 (DE) .......................................... 100 49 283

(51) Int. Cl.⁷ ................................................ B23P 15/00
(52) U.S. Cl. ................................ 29/895.21; 29/895.22; 29/895.23; 29/895.3; 72/51
(58) Field of Search ......................... 29/895.21, 895.22, 29/895.23, 895.3; 72/51; 219/121.6, 121.63, 121.64

(56) References Cited

U.S. PATENT DOCUMENTS

| 2,177,104 | A | * | 10/1939 | Gonser ........................... 413/1 |
| 3,802,239 | A | * | 4/1974 | Karmann et al. .............. 72/51 |
| 4,513,596 | A | * | 4/1985 | Usher ............................ 72/51 |
| 4,675,496 | A | * | 6/1987 | Toyoshima et al. ..... 219/121.64 |
| 4,706,488 | A | * | 11/1987 | Williamson ................... 72/96 |
| 5,011,054 | A | * | 4/1991 | Mauffette .................... 223/88 |
| 5,321,889 | A | * | 6/1994 | Watanabe ................. 29/895.3 |
| 5,351,615 | A | * | 10/1994 | Kobler et al. ............... 101/217 |
| 5,379,693 | A | * | 1/1995 | Hoffmann et al. ........... 101/375 |
| 5,488,903 | A | * | 2/1996 | Kobler et al. ................ 101/375 |
| 5,499,580 | A | * | 3/1996 | Hoffmann et al. .......... 101/375 |
| 5,613,631 | A | * | 3/1997 | Ziemek et al. .............. 228/148 |
| 5,658,473 | A | * | 8/1997 | Ziemek .................... 219/121.64 |
| 5,796,068 | A | * | 8/1998 | Jones .................... 219/121.63 |
| 5,900,079 | A | * | 5/1999 | Ono et al. ................... 148/519 |
| 5,932,117 | A | * | 8/1999 | Johnson et al. ........ 219/121.63 |
| 6,098,869 | A | * | 8/2000 | Bonsen ........................ 228/147 |
| 6,503,074 | B2 | * | 1/2003 | Helm et al. .................. 425/194 |
| 2002/0040890 | A1 | * | 4/2002 | Meyer et al. ........... 219/121.64 |

FOREIGN PATENT DOCUMENTS

| DE | 37 39 792 C2 | 9/1989 |
| DE | 41 25 931 A1 | 2/1993 |
| DE | 195 08 421 A1 | 9/1996 |
| DE | 196 27 638 A1 | 1/1998 |

* cited by examiner

Primary Examiner—I Cuda Rosenbaum
(74) Attorney, Agent, or Firm—Browdy and Neimark

(57) ABSTRACT

In a method and an apparatus for the production of a cylindrical embossing sheet that is to be fixed on a rotating clamping cylinder for the manufacture of continuous webs having surface structures, such as holograms, cine-grams, exelgrams, for safety and reliability engineering and decoration purposes, it is provided that the plate-like starting material is bent around an auxiliary implement in particular of cylindrical shape, the diameter of which corresponds approximately to the diameter of the clamping cylinder, with the plate-like starting material being prepared such that, when it is placed around the auxiliary implement, the longitudinal edges butt against each other by a flush joint, and that the plate-like material is fixed in this position, and that the longitudinal edges are then welded together without any gaps by means of a laser.

7 Claims, No Drawings

METHOD FOR THE PRODUCTION OF A CYLINDRICAL EMBOSSING SHEET

BACKGROUND OF THE INVENTION

1. Field of the Invention

The invention relates to a method and an apparatus for the production of a cylindrical embossing sheet to be fixed on a rotating clamping cylinder for the manufacture of continuous webs having surface structures, such as holograms, cinegrams, exelgrams, for safety and reliability engineering and/or surface structures for decoration purposes.

2. Background Art

Conventionally, the plate-like starting material is glued, or otherwise fixed, plainly on the clamping cylinder. The drawback resides in that a gap will form crosswise of the running direction at the edges of the joint of the plates. Frequently, residue of formable substrate (for instance lacquer) deposits in this gap, in particular if duplication takes place into uncrosslinked or wet layers. These deposits negatively affect the finished impression, particularly since they increase continuously in size, this virtually inducing the seam to grow.

SUMMARY OF THE INVENTION

It is an object of the invention to avoid the drawbacks of known methods and to embody a method that can be put into practice efficiently and rapidly, resulting in high-quality duplication of the surface structure.

According to the invention, this object is attained by the plate-like starting material being bent around an auxiliary implement on particular of cylindrical shape, the diameter of which corresponds approximately to the diameter of the clamping cylinder, wherein the plate-like starting material is pre-pared such that, when it is placed around the auxiliary implement, the longitudinal edges will butt against each other by a flush joint, and that the plate-like material is fixed in this position, and that the longitudinal edges are then welded together without any gaps by means of a laser. Thus produced, the embossing sheet may then be removed from the auxiliary implement and mounted on a clamping cylinder.

When tunable lasers are used for the welding job, it is advantageously provided that a smoothing seam does not serve for joining, but exclusively for smoothing the surface of the joining weld produced by the first laser.

For smoothing this seam, provision can be made additionally or alternatively for a smoothing roll that bears flexibly against the seam.

For joint edges to be obtained that butt against each other accurately by a flush joint, it is provided that cutting the plate-like material to size is implemented by a cutting laser.

The embossing sheet thus produced is elastically expansible by compressed air in a manner known per se for being placed on the clamping cylinder; once the compressed is switched off, the embossing sheet will rest by radial contraction on the cylinder casing of the clamping cylinder.

By alternative, provision can be made for a shrinking method according to which the clamping cylinder is cooled inwardly for it to contract in the radial direction so that the embossing sheet can be placed on, fitting tightly after subsequent heating.

CONCLUSION

In conclusion, it can be said that the method according to the invention enables the embossing sheet to be easily and rapidly mounted on a clamping cylinder and to be disassembled without damages, which ensures multiple use of the embossing sheet whenever a change of pattern is needed. Corrections of position are possible due to the fact that the embossing sheet is axially and radially displaceable on the clamping cylinder. Furthermore, no problems arise when sever of these embossing sheets have to be mounter on a clamping cylinder. Also, simple correction of position is possible for adjustment to any subsequent printing unit (for instance an engraved cylinder).

What is claimed is:

1. A method for producing a cylindrical embossing sheet to be fixed on a rotatable clamping cylinder for the manufacture of continuous webs which has surface structures for safety and reliability engineering or decoration purposes, said method comprising the steps of:

bending a starting material around an auxiliary implement having a cylindrical shape, the diameter of which corresponds approximately to the diameter of the clamping cylinder, positioning the starting material when bent around the auxiliary implement so that longitudinal edges thereof butt against each other in a flush joint, welding the longitudinal edges of the starting material together with a laser when fixed on the auxiliary implement to eliminate any gaps between the longitudinal edges; and applying a smoothing seam over the welded longitudinal edges with the laser.

2. The method according to claim 1, further comprising the steps of:

smoothing the smoothing seam with a smoothing roll that is flexibly pressed thereon.

3. The method according to claim 1, further comprising the step of:

cutting the starting material with a cutting laser before bending the starting material around the auxiliary implement.

4. The method according to claim 1, further comprising the step of:

removing the completed cylindrical embossing sheet from the auxiliary implement and placing it on the clamping cylinder.

5. The method according to claim 4, further comprising the steps of:

placing and positioning the embossing sheet on the clamping cylinder by ejecting compressed air through compressed air openings which are directed radially outward on the clamping cylinder, and thereafter fixing the embossing sheet on the clamping cylinder by switching the compressed air off.

6. The method according to claim 4, further comprising the steps of:

placing and positioning the embossed sheet on the clamping cylinder by first cooling the clamping cylinder and thereafter fixing the embossing on the clamping cylinder by heating the cooled clamping cylinder.

7. The method according to claim 1, where the surface structures include holograms, cinegrams and exelgrams.

* * * * *